(12) United States Patent
Ouchi (10) Patent No.: US 7,680,704 B2
(45) Date of Patent: Mar. 16, 2010

(54) COMPACT ITEM DESCRIPTOR, CATALOG SYSTEM AND ITEM PART NUMBER VALIDATION

(76) Inventor: Norman Ken Ouchi, 20248 View Crest Ct., San Jose, CA (US) 95120

( * ) Notice: Subject to any disclaimer, the term of this patent is extended or adjusted under 35 U.S.C. 154(b) by 1364 days.

(21) Appl. No.: 10/602,301

(22) Filed: Jun. 24, 2003

(65) Prior Publication Data

US 2004/0267636 A1    Dec. 30, 2004

(51) Int. Cl.
*G06F 17/30* (2006.01)
*A01K 5/02* (2006.01)

(52) U.S. Cl. .......................... 705/27; 705/29
(58) Field of Classification Search ................... 705/28
See application file for complete search history.

(56) References Cited

U.S. PATENT DOCUMENTS

| | | | |
|---|---|---|---|
| 4,984,155 A | 1/1991 | Geier et al. ................... 705/26 |
| 4,992,940 A | 2/1991 | Dworkin ...................... 705/26 |
| 5,231,566 A * | 7/1993 | Blutinger et al. .............. 705/27 |
| 5,319,542 A | 6/1994 | King, Jr. et al. ............... 705/27 |
| 5,675,784 A | 10/1997 | Maxwell et al. ............. 707/100 |
| 5,740,425 A | 4/1998 | Povilus ....................... 707/100 |
| 5,838,965 A * | 11/1998 | Kavanagh et al. ....... 707/103 R |
| 6,055,516 A | 4/2000 | Johnson et al. ................ 705/27 |
| 6,101,515 A | 8/2000 | Wical et al. ................. 715/531 |
| 6,360,216 B1 | 3/2002 | Hennessey et al. ............. 707/3 |
| 6,578,030 B1 | 6/2003 | Wilmsen et al. ................ 707/3 |
| 2003/0221172 A1 * | 11/2003 | Brathwaite et al. ............. 716/1 |

OTHER PUBLICATIONS

RosettaNet Technical Dictionary Description—RosettaNet.Org Web site.

* cited by examiner

*Primary Examiner*—F. Ryan Zeender
*Assistant Examiner*—Faris Almatrahi (57) ABSTRACT

In the present invention, items are described with a compact item descriptor where two items with the same compact item descriptor are interchangeable. The compact item descriptor can be generated for an item using a classification process and a set of parameters with values that describe the item.

An organization assigns an identifier, a part number, to an item. The compact descriptor for the part number is stored in the item description field of the materials planning system and in the Approved Manufacturing List, AML. The AML identifies the supplier and supplier part number that may be ordered as the item. The Bill of Materials, BoM, for a product, is the parts list to build the product. The AML is used to identify the suppliers and supplier part number to purchase items needed to build the product The AML may contain errors and must be validated by the contract manufacturing company, called an EMS, Electronic Manufacturing Service provider. The EMS can use the compact item descriptor to validate or change the AML for a product quotation, for the ordering parts or components on the BoM.

19 Claims, 6 Drawing Sheets

COMPACT ITEM DESCRIPTOR, CATALOG SYSTEM AND ITEM PART NUMBER VALIDATION

CROSS-REFERENCE TO RELATED APPLICATIONS

None

STATEMENT REGARDING FEDERALLY SPONSORED RESEARCH OR DEVELOPMENT

None

FIELD OF THE INVENTION

This invention is related to item descriptors and the organization of a catalog used to validate item supplier part numbers in materials planning system and/or Approved Manufacturer List.

BRIEF SUMMARY OF THE INVENTION

In the present invention, items are described with a compact item descriptor where two items with the same compact item descriptor are interchangeable. The compact item descriptor can be generated for an item using a classification process and a set of parameters with values that describe the item.

An organization assigns an identifier, a part number, to an item. The compact descriptor for the part number is stored in the item description field of the materials planning system and in the Approved Manufacturing List, AML. The AML identifies the supplier and supplier part number that may be ordered as the item. The Bill of Materials, BoM, for a product, is the parts list to build the product. The AML is used to identify the suppliers and supplier part number to purchase items needed to build the product The AML may contain errors and must be validated by the contract manufacturing company, called an EMS, Electronic Manufacturing Service provider. The EMS can use the compact item descriptor to validate or change the AML for a product quotation, for the ordering parts or components on the BoM.

BACKGROUND OF THE INVENTION

A product is manufactured from materials. The list of materials and quantities of each item listed is called a Bill of Material, or BoM. The list of ingredients for a baking recipe is the BoM for the recipe. The BoM for making bread would list the number of cups of flour, the cups of water, tablespoons of baking power, etc. The home baker would buy flour, baking power, etc. and gather the proper amounts of the ingredients to bake the bread. The recipe for home use would describe flour as "flour" or "white flour" relying on the knowledge of the person to purchase the correct flour and ordering of flour based on the bread requirements.

A commercial bakery would use a materials planning system called an "Enterprise Resource Planning", ERP, system or a "Materials Requirements Planning", MRP, system to plan the purchasing of flour and other materials require to bake the bread to meet customer demand. The term "white flour" is assigned an internal system identifier usually called a part number. The part number is usually a sequence of digits and letters that are unique within the system to identify the item, in this case, white flour. For this example, the part number for white flour in the bakery system is 12345. The system usually provides a set of fields called an item master to describe the item and used in the system processes that are associated with the item. The item master may include: an item description; the quantity for each unit of the item, e.g. 100 pounds per bag; the supplier from whom the item is purchased, e.g. Acme Flour; the part number that Acme Flour uses to order flour, e.g. part number WFL100 for 100 pound bags of white flour The system can determine the amount of flour to order from Acme to bake the bread needed to be produced. The bakery system uses the Acme part number in the purchase order sent to Acme so that the Acme system will direct the production and delivery of the correct number bags of designated flour in the designated bag size.

The bakery may have a document called the Approved Manufacture List, AML, which associates the bakery part number with the supplier and supplier part number. In the case for white flour, the AML is of the form:

Part number: 12345 Description: white flour
Supplier: Acme Supplier Part number: BFL100

The BoM describes "what" and "how man" and the AML describes "from whom" and the part number to purchase the items that are the materials for the product.

The AML is not a critical document to the bakery since it usually reflects the contents of the bakery system. However, if the bakery transfers the baking of bread to another site with a different system or to a third party contract bakery, the AML is important since it maps the bakery part number to the supplier part number so the correct flour and bag weight is ordered. Validation of the AML is an important process for the transfer of a BoM from one system to another. The transfer of the product to another site or third party bakery may require that the supplier of flour be changed to a second supplier. The part number for ordering the correct flour and bag weight from the second supplier must replace the first supplier and part number in the AML. The validation process and the second supplier replacement processes are manual. These manual processes are tedious and error prone since the part numbers are just strings of characters and digits.

AML errors can cause significant problems. Errors in the AML are usually not detected until the product goes into production. The wrong item or wrong quantity is discovered when the first set of units are produced. These errors can cause very significant delays that result in higher costs and delays in time to market. The errors can be corrected in three ways:

1. The correct supplier part number is entered into the system for subsequent orders and the AML is corrected to reflect the change.
2. The correct supplier part number is entered into the system.
3. The supplier modifies the supplier order entry system so the incorrect part number will ship the correct part when received from that customer.

Corrections 2 and 3 are frequent in the electronics industry. As a result, the AML is not correct. A product can be produced at one site but not producible at another site until the AML errors are corrected again.

In the electronics industry, third party contract manufacturers manufacture most of the products. The correct AML is important to the contact manufacturer when quoting a contract to manufacture the product since the contract manufacturer may be buying the components and a pricing error due to an AML error can mean a loss to the contract manufacturer either through higher costs when manufacturing or not winning the contract because the apparent cost was higher than that of a competitor. Also, the contract manufacturer may have relationships with other suppliers that provide better cost and/or service. The contract manufacturer would like to change the AML to reflect the use of these preferred suppliers by substituting these suppliers and the appropriate supplier part numbers. The corrected AML is important in every phase of the production for a contract manufacturer.

Acme Flour may produce a variety of flours: white flour, whole-wheat flour, whole grain flour, etc. and ship flour in a variety of bag sizes: 10 pound, 50 pound, 100 pound, etc. The Acme Flour system must be able to distinguish between each type of flour and each size of bag. Acme Flour assigns a unique part number to each combination of flour and bag size. For example, WFL100 is the part number for 100-pound bags of white flour, WFL50 the part number of 50-pound bags of white flour, etc. The part number may be understandable by a human once the assignment algorithm is understood or the part number may be a string of numbers and letters: 1234-4567, 1234-9854, etc. Most part number assignment processes assign the next available part number, so the part number and the item it represents are not easily associated.

A contract bakery may use the same supplier for flour but require a different bag size. The different bag size may be due to differences in equipment, etc. The part number in the AML provided by the bakery is correct for the type of flour but incorrect in bag size. The contract bakery must correct the AML to order the correct bag size.

The electronics industry has similar constraints for the electronic components used to assemble products. The most components are very small and are affixed to carriers for handling and feeding into the automated assembly equipment. The carrier for a component must match the assembly machine that will place the component. The supplier part number includes the carrier type. Most suppliers have a "core" part number independent of the carrier and concatenate a suffix to indicate the carrier. The core and suffix form the part number used to order a component in a carrier. When the production an electronic product is transferred from a first assembly line to a second assembly line with different assembly equipment requiring different component carriers, the components must be ordered with the carriers for the second assembly line since the carriers for the first assembly line will not work on the equipment of the second assembly line. An important part of the AML validation is selecting the carrier that will work with the assembly equipment for the line to assemble the product.

Most companies provide a catalog that systematically organizes the description of the products offered for sale by the company and the part number to be used to order the item. Catalogs are usually organized for people to search for items. Some catalogs are organized for searching by computer programs where the item description is encoded in a standard form for a parametric search. Classification methods have been used to organize sets of items. Classification of the items can provide an organization of the items so items may be easily found in a catalog. A characteristic is a property of an item. A parameter is a characteristic with a range of values used to distinguish items. Two Items with the same parameters with the same set of values are interchangeable. The parameters must be selected to distinguish items so that items are interchangeable for a particular use. The interchangeable items may differ in other characteristics but interchangeable for the use for which the set of parameters were selected. For example, 100-pound bags of white flour are interchangeable for use in industrial baking in that all bags contain white flour and weigh 100 pounds. The color of the bags or the dimensions of the bag are not important for this use and were not considered as parameters. A 50-pound bag of white flour is not interchangeable with a 100-pound bag since ordering one bag results in only 50 pounds of white flour rather than 100 pounds. In this example, the parameters are type of flour and bag weight. Note that the implicit classification is flour in bags. Flour can be a sub classification of ground grains, and ground grains can be a sub classification of grains, etc. The classification system need not be derived from fundamentals but from the expected experience of the catalog users. A catalog of a flour producer can be organized with flour as a basic classification and only the types of flour and flour characteristics are considered as candidates for parameters.

Figure 1:
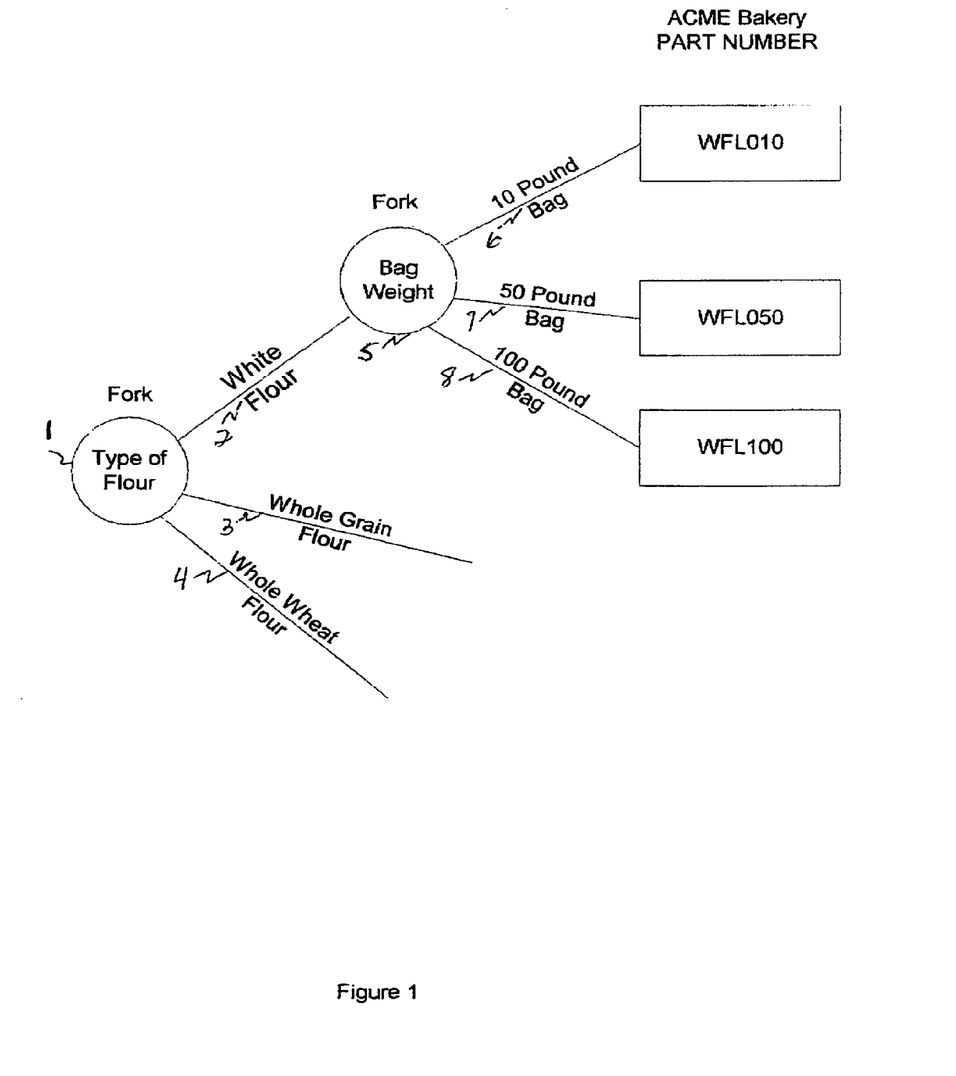
FIG. 1 illustrates a classification tree for white flour.

The objective of a classification of items for a catalog is to identify interchangeable items for the expected use. The selection of parameters is important as well as the grouping of parameters to organize the items for a systematic and "natural" search for match, the set of interchangeable items. Classification can be thought of as a tree with a parameter at each fork with different values for each branch. A classification tree for the Acme is illustrated in FIG. 1. The first fork 1 is from the base of the tree where the parameter "type of flour" forms the branches. There are three branches: white flour 2, whole-wheat flour 4, and whole-grain flour 3. The white flour 2 branch has a parameter for bag weight 5 with three branches: 10-pounds 6, 50-pounds 7 and 100-pounds 8. The terminus of each branch, a leaf, is an item that can be ordered from Acme and is assigned an Acme part number. An Acme customer can find the part number for 100-pound bags of white flour from the catalog by first selecting the white flour 2 branch and then selecting the 100-pound bags branch. The 100-pound bag 8 is a leaf and the catalog provides the Acme part number for ordering a 100-pound bag of white flour From the classification tree, the Acme customer also can see that Acme sells whole-wheat flour and whole-grain flour and can follow these branches and by selecting values for parameters at forks (which are not illustrated) to determine the part number of these other flour types.

Figure 2:
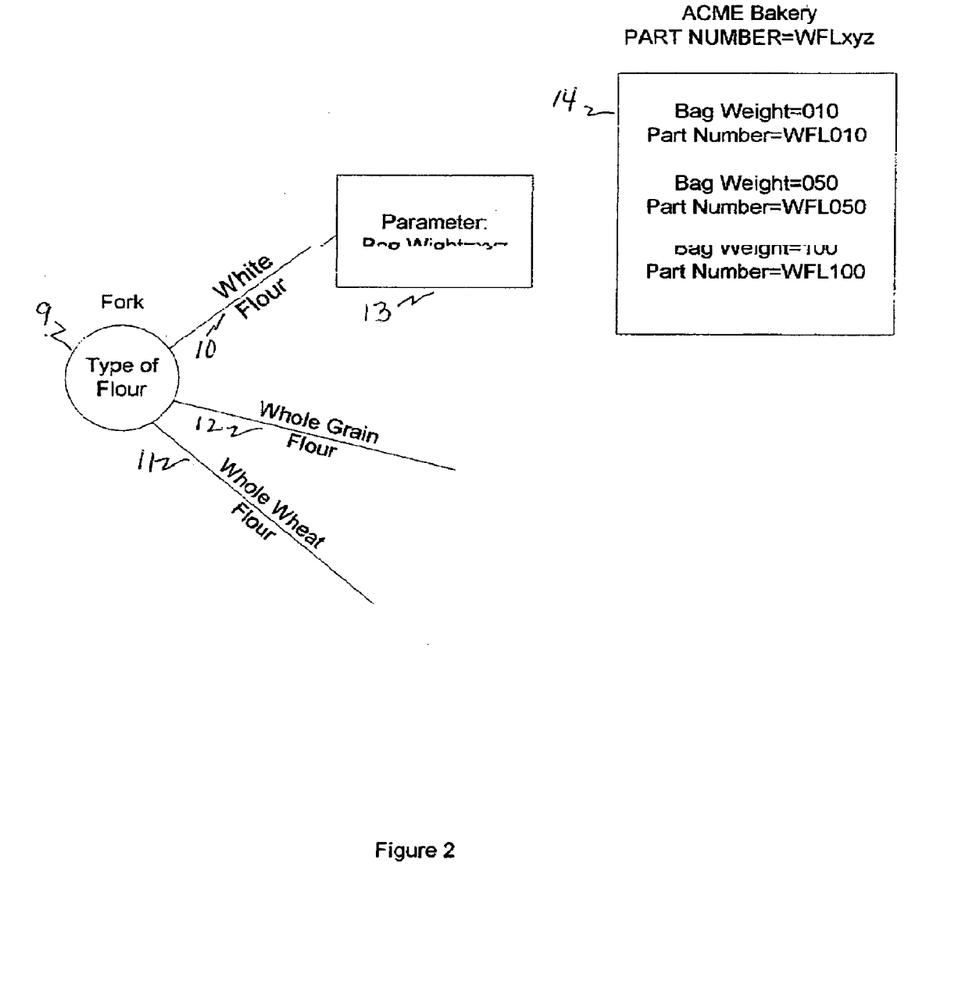
FIG. 2 illustrates a classification tree with parameter-values for white flour.

The Acme catalog can be organized with a smaller number of forks and branches by assigning a lower order branch as a leaf and defining the remaining parameters as values. In the white flour example, a different classification tree can be defined as illustrated in FIG. 2. The first fork 9 of the classification tree has three branches: white flour 10, whole-wheat flour 11, and whole-grain flour 12. The white flour branch is a leaf with one parameter; bag weight 13. Bag weight 14 is permitted three values: 10-pound, 50-pound, and 100-pound. When the parameter is selected, the part number for the classified item with the specific parameter is provided. Classification with parameters is useful when the number of permitted values is large or when values for two parameters interact and may be difficult to express as a tree. As an example, a resistor is an electronic item that is manufactured from many different materials and in many shapes. A resistor can be manufactured to provide a specific resistance value within a range of values. The range may provide several thousand different values. Creating a classification tree branch for each value may make the catalog cumbersome for users. Resistance may be best represented as a parameter with a range of values. Many resistor manufacturers generate the part number for a resistor with the resistance value as part of the part number. For example, an 1100-ohm resistor may have the part number R1100, where the "1100" represents the four significant digits of resistance. The parameter values may interact and not be represented as a tree. For example, the manufacturing process for resistors is not uniform and high precision for resistance value is difficult to achieve. The value assigned to the resistance value may limit the precision of the resistance. An 1100-ohm resistor can have a 5% resistance variation while an 110,000-ohm resistor can have a 7% resistance variation. These interactions may be difficult to express as a tree. A catalog can be represented as a classification tree with leaf terminals with parameters with range of values. A classification and parameters with set of valid values represents an item in the catalog.

People can use a catalog that requires interpretation and judgment because people can operate in an environment with a wide range of ambiguity. A computer system requires a systematic catalog to identify an item based on a description. In fact, the description must be systematic for use by a computer system. In the electronics industry, a consortium of companies formed a non-profit organization called RosettaNet to standardize the catalog structures and means to query the catalogs so that computer system can be used to identify items. Classification structures, called taxonomies, have been defined and parameters have been identified for a large number of types of items used by the electronics industry. Examples of the types of items are: capacitors, resistors, logic, connectors, etc. RosettaNet is based on XML, an Internet standard for defining the terms, called tags, used to associate parameters with values in messages. For example using XML, a parameter for item type could be defined as <item_type> and a message with the character string: <item_type>capacitor</item_type> would indicate to the receiving system that the parameter item type has the value "capacitor". A RosettaNet standard catalog for electronic items requires that each item in the catalog conform to the taxonomy for the type of item. The taxonomy includes a list of parameters that describe the item. The catalog is queried by assigning a value to each parameter in the list as an XML message. If the catalog has an item matching the set of parameter-values, the catalog responds with the catalog part number that can be used to order the item. RosettaNet envisions computer systems sending queries to catalogs rather than people so the length of the XML message is not a problem.

However, the AML validation process continues to be manual since it requires a person to know the characteristics of the item in order to validate the supplier part number or to select the part number of an interchangeable item from a second supplier. The electronic catalogs and XML standards automate the catalog query but a person must look at the AML, determine the type of item, determine the parameters, and determine the values to form the query. The AML for the BoM for baking bread may be five to ten items and not a significant process. The AML for the BoM of an electronic product may be several hundred to several thousand items. Validation of the AML is a measurable time delay in the quotation process and in starting an electronic product into production. An automated process for AML validation can reduce the time delay and reduce the number of errors that can cause significant increases in cost and time delays.

BRIEF DESCRIPTION OF DRAWINGS

Table 1 illustrates the Classification SQL Table for the classification tree of FIG. 3.

Table 2 illustrates the Parameter SQL Table for the parameters of FIG. 3.

Table 4 illustrates the Item Catalog as an SQL table where the supplier, supplier part number in the part number field, compact item descriptor in the description field, and commodity codes are organized for queries that relate these fields including distinct items that are interchangeable and have the same compact item descriptor.

Table 5 illustrates the Supplier P/N Alias Table as an SQL table that relates alias part numbers for an item where a query with the alias part number returns the item with the compact descriptor.

Table 6 illustrates the Supplier Suffix Table as an SQL table that relates a supplier and manufacturing process requirements with the modification of the part number for an item that meets the manufacturing process requirements.

DESCRIPTION OF THE INVENTION

The ERP or MRP system provides an item description field for each item identified in the system. The description field is usually a short text field of 20 to 50 characters. A data entry person usually enters the item description when the item is defined in the system. Most companies have a loose standard on the format of the description since people read this field and can interpret the meaning. The ERP or MRP system may have a commodity code field. This field is usually used to determine the set of buyers who are responsible for the purchasing sets of commodities. The data entry person also enters this field. The contents and correctness of this field has operational importance and errors are usually detected and corrected quickly. However, the commodity code is defined within a company, specific to that company, and not part of most AML's.

The AML to be validated consists of four fields:
Part number: 12345 Description: white flour
Supplier: Acme Supplier Part number: BFL100

The present invention generates a compact item descriptor based on the classification and parameter-values that describe the item. The compact item descriptor is stored in the description field of the materials system and the AML and is used to identify the item and interchangeable items. The data entry person classifies the item and enters the parameter values. The compact item descriptor is generated and stored in the item description field in the item master. The compact item descriptor is then used to query a catalog to provide the supplier and supplier part and inserted by the catalog into the ERP or MRP supplier and supplier part number fields. The classification of the item and a subset of the parameter-values generate the commodity code and the commodity code is inserted into the ERP or MRP system. The AML is generated from the part number, the description, the supplier, and supplier part number in the ERP or MRP system.

When a product is sent to a third party contract manufacturer, the BoM and AML are two of the key documents that describe the product. The BoM describes "what" and "how many" and the AML describes "from whom" and the part number to purchase the items that are the materials for the product. The contract manufacturer can validate the AML for each part number by querying the catalog using the compact descriptor and supplier name as search arguments and comparing the supplier part number with the part number in the AML.

The contract manufacturer may require a different carrier (for example bag weight) for the item than that used by the original company. In the bakery example, the AML had the supplier part number for 100-pound bags but the contract bakery needed 50-pound bags with a different part number. As with the bags of flour, the bag size was the last parameter fork in the classification tree or is one of the parameters in the list. The contract manufacturer can systematically query the catalog with the compact descriptor modified for the required carrier. The modified compact item descriptor is stored in the description field and the supplier part number is stored in the supplier part number field of the contract manufacturer ERP or MRP system. Since carrier is part of the description that has the most frequent change, the compact item descriptor can be defined as a "core" portion with a carrier suffix. This structure is similar to that used by many suppliers. The carrier requirements for an assembly line can be defined and the catalog queries for components are specific to the assembly line.

The AML validation can be performed before the assembly line is specified. The difficult portion of the verification process is the determination of the core supplier part number. The carrier portion of the part number can be assigned when the assembly line is determined and is easily automated. The two-phase AML validation process first generates an AML that is assembly line independent and second generates an AML that is specific to an assembly line. The assembly line independent AML can be used to generate the AML for assembly of the product on a second line by selecting the carrier suffixes.

The contract manufacturer may want to replace the entry for one supplier with that of a second supplier. The contract manufacturer queries the catalog using the compact item descriptor and second supplier as arguments. The catalog responds with the part number of the second supplier of an interchangeable item. If the second supplier does not provide the item, then the catalog returns an indicator that the second supplier does not supply the item.

The using the compact item descriptor, the validation of supplier part number, the change of carrier, and the substitution of a second supplier can be systematically performed on the AML without human assistance except for exception processes.

Figure 4:
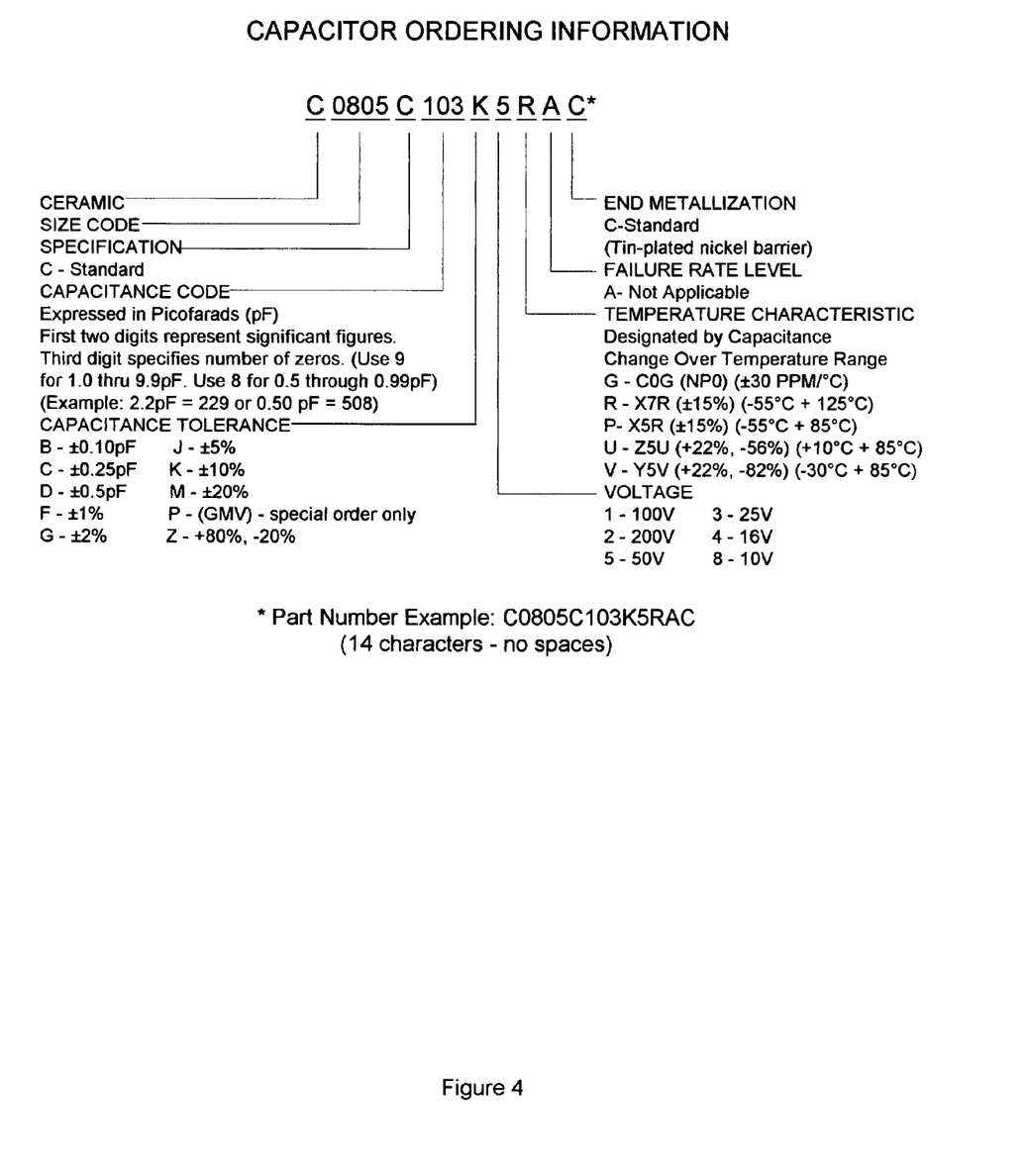
FIG. 4 illustrates the part number structure for a Kemet ceramic capacitor
Figure 5:
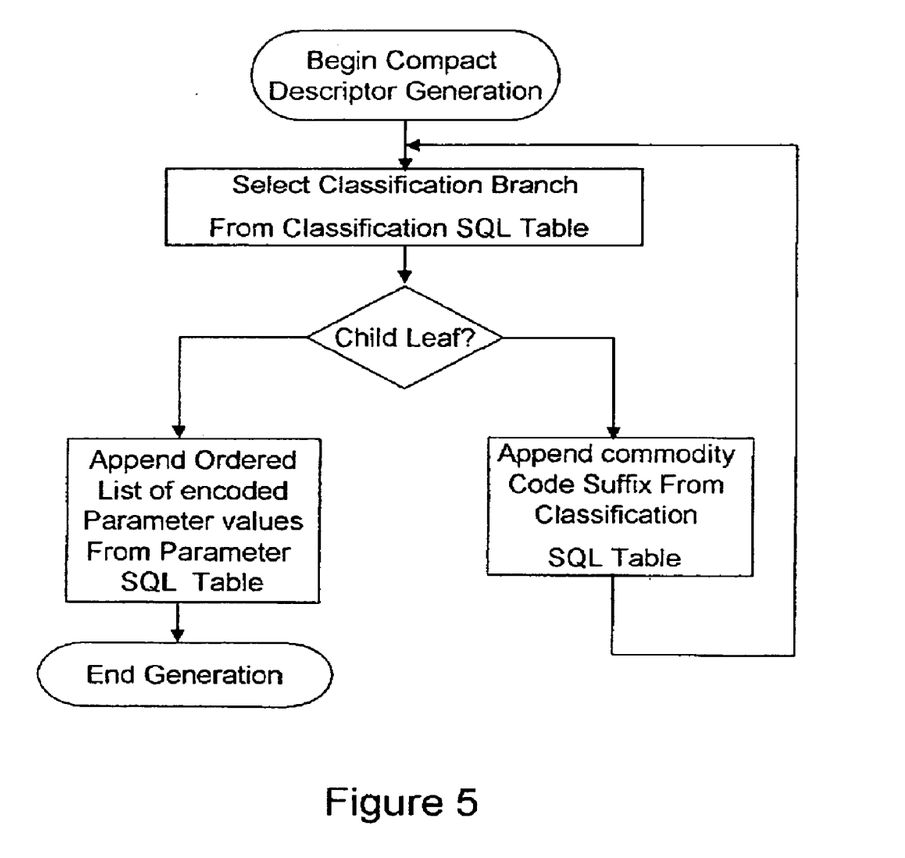
FIG. 5 illustrates a flowchart of the Compact Descriptor Generation using the Classification SQL Table and Parameter SQL Table.
Figure 6:
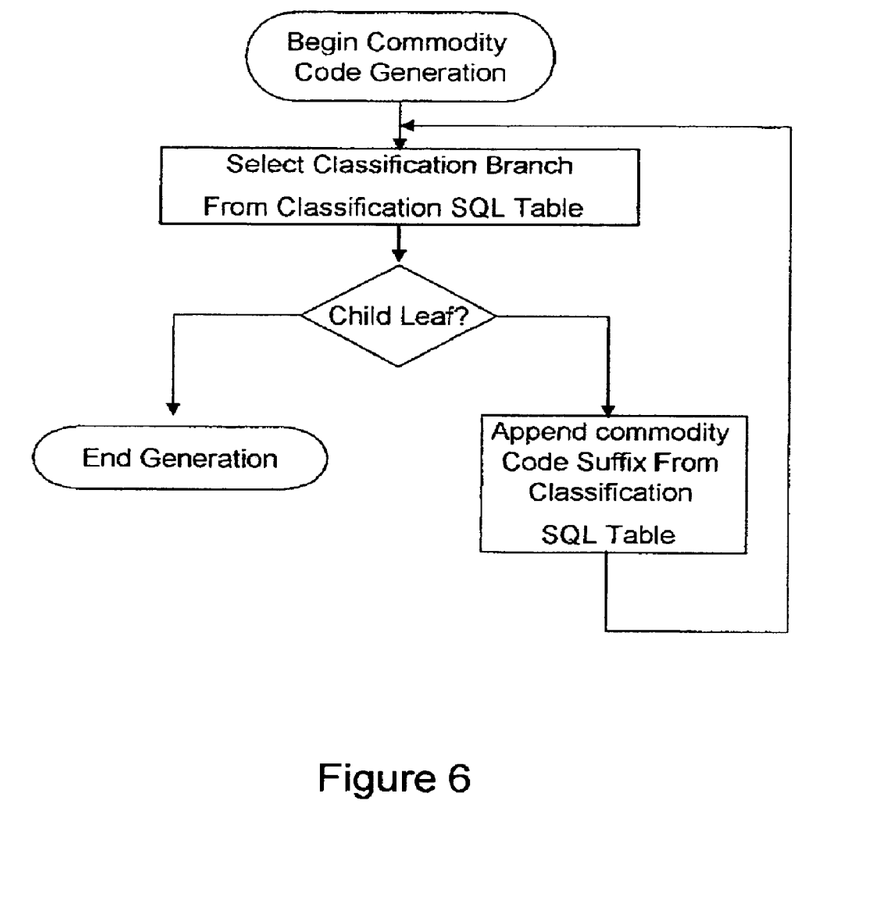
FIG. 6 illustrates a flowchart of the Commodity Code Generation using the Classification SQL Table.

The compact item descriptor is generated from the classification of the item and the parameter-values list to describe the item and interchangeable items. The result of the classification is a short unique character string. The parameter list is represented as a predetermined sequence of parameters where value of a parameter is encoded as a short character string of predetermined length representing the value. For example, the compact descriptor for white flour can be defined as the string "WF" for the classification for white flour and three digits representing the values for the parameter bag weight. "WF010" is the compact item descriptor for 10-pound bags of white flour; "WF050" for 50-pound bags, and "WF100" for 100-pound bags. Electronic items are not as simple to classify and the parameter lists are more extensive. The RosettaNet taxonomies have demonstrated that electronic items can be classified and the list of parameter-values can be determined to describe items. The number of characters required to create full compact item descriptors is in the range of 20 to 30 characters. A second test to provide an upper bound to the length of compact item descriptors is the part number systems used by capacitor, resistor, and connector manufacturers. These manufacturers encode the characteristics of the items in the part number. These part numbers are usually less than 20 characters in length. FIG. 4 illustrates the core part number for a Kemet ceramic capacitor, which is 14 characters in length. The carrier suffix, which is two or four additional characters, is not illustrated.

The compact item descriptor can include characters in the parameter-value field to make the compact item descriptor human readable without a significant increase in string length. For example, the string "Bw" with three digits could represent the bag weight. The compact item descriptor for a 10-pound bag of white flour would then be "WFBw010".

The contact manufacturer will receive AML's that do not have a compact item descriptor in the description field. The catalog is additionally designed to respond to queries with the supplier name and supplier part number. The catalog responds with the compact item descriptor for the item and inserts it into the item master description field of the ERP or MRP system and the AML. The catalog returns the supplier part number with the carrier for the assembly line equipment. The supplier part number in the original AML may not be correct or may have the carrier suffix. The catalog can be queried using "wild cards" in the supplier part number or in the compact item descriptor. The wild cards for the Standard Query Language, SQL, databases provide for balance of string wild card "%" single character wild card "_", single character within a range of characters wild card "[a-c]", and a single character exclusive of a range of characters wild card "[^a-c]". The wild cards may be used in combination by substituting the wild card string for the character location where the wild card is in effect. These provide significant flexibility to find the correct supplier part number given a partially correct supplier part number or a description of the item. The catalog may return one or more part numbers for different items that match the query request with wild cards in the supplier part number. The wild card does place a limitation on supplier part numbers and compact item descriptors in that "%", "_", etc. cannot be part of a normal supplier part number or compact item descriptor.

If the query with the supplier part number in the AML fails or if the AML does not have the supplier part number, the item can be classified and parameter-values assigned to create the compact item descriptor. The catalog will return the supplier part number for the item. The compact item descriptor is then inserted into the description field of the item master of the ERP or MRP system and the AML.

The catalog is additionally designed to assign a set of supplier part numbers to a core compact item descriptor and core supplier part number. The AML's may have the supplier part number with the carrier suffix. Since there are a variety of carriers, there are number of supplier part numbers that refer to the same core part number and core compact item descriptor.

The catalog does not contain all of the items for the entire electronics industry. When an item found to not be in the catalog, a catalog entry can be added with the supplier name, supplier core part number, core compact item descriptor, and carrier suffixes. Over time the catalog will contain most of the items used and just a small number of items are added. The information on supplier items in the supplier catalog can be extracted and the supplier description of an item can be mapped to a compact item descriptor for the item. The supplier part number can be added to the catalog with the compact item descriptor. A supplier can organize its catalog to accept compact item descriptors as query arguments. If the supplier supports the RosettaNet catalog taxonomy, the compact item descriptor can be mapped to a RosettaNet XML query and the supplier catalog can be queried to return the supplier part number and carrier suffixes. If the supplier catalog does not support RosettaNet, the compact item descriptor can be mapped to the query structure of the supplier catalog and the supplier catalog response can be mapped to return the supplier part number and carrier suffixes.

In either case, the catalog need not be a single physical catalog but rather the use of the Internet and supplier catalogs. In effect, then the "catalog" contains all of the items in the electronic industry.

Some item types such as capacitors, resistors, and connectors, have a large number of potential parameter-value combinations. The manufacturers of these types of items do not assign an arbitrary part number to each combination but derive the part number from the values assigned to each parameter. The manufacturer does not have a catalog that lists all possible part numbers but provides the procedure by which the part number can be generated. The compact item descriptor, by definition, has the parameter values from which the supplier part number can be generated. The catalog can use the manufacturer's process to generate the supplier part number from the compact item descriptor rather than keep a table with all possible supplier part numbers.

Classifying the item and assigning the values to the parameters generates the compact item descriptor. The compact item descriptor contains the information that describes the item to identify interchangeable items for purchase from suppliers. A catalog accepts the compact item descriptor and supplier name in the query and returns a supplier part number for the item that matches the compact item descriptor. The catalog accepts the compact item descriptor in the query and returns a supplier name and supplier part number for the item that matches the compact item descriptor. The catalog additionally accepts a supplier name and supplier part number as query arguments and returns the compact item descriptor. A set of supplier part numbers can refer to a single core supplier part number. The catalog can also accept the supplier name and any one of the set of supplier part numbers as query arguments and returns the compact item descriptor and the core supplier part number. The catalog can also accept the supplier name and a supplier part number with wild cards as query arguments and returns all compact item descriptors and supplier part numbers that match the supplier part number with wild cards. The catalog can be populated using information from the supplier catalogs or the supplier catalog can be queried using the compact item descriptor mapped to a standard query such as RosettaNet or to the query structure of the supplier.

DESCRIPTION OF A PREFERRED EMBODIMENT

The classification tree process, compact item identifier descriptor generator, the item catalog, and part number validation process are implemented as software programs written in Java, C++, Microsoft Visual Basic, or a number of programming languages. The programs may use a database for storing the classification tree information, compact item descriptor generator, item catalog, part number validation information, and other information. Database programs are available from Oracle, IBM, Microsoft, and many other providers. These programs and databases execute in computers manufactured by, for example, IBM, Sun, Dell, and HP. The computers may be, for example, PC's, workstations, mainframes, and hand-held computers. The computers may have an operating system such as UNIX, LINUX, Microsoft 2000, and IBM OS/9000. The computer is connected to a network that may be, for example, a LAN, WAN, Internet, Intranet, wireless LAN, or wireless Internet.

The classification tree is implemented as recursive linked list with the information stored in an SQL database. Each branch or leaf is represented as a row in a SQL table. Table 1 Classification Tree SQL Table is representative of the classification table where Child is the name of branch or leaf, Parent is the name of the branch from which the Child is linked, Commodity Code is the portion of the commodity code for a branch or the complete commodity code for a leaf, the description of the branch or leaf, and branch or leaf indicator.

TABLE 1

Classification Tree SQL Table

| Child | Parent | Commodity Code | Description | Branch/Leaf |
|---|---|---|---|---|
| Capacitor 16 | Root 15 | C 20 | All capacitors | branch |
| Resistor 18 | Root 15 | R 24 | All resistors | branch |
| Ceramic 17 | Capacitor 16 | Cc 21 | Ceramic caps | branch |
| Chip 19 | Ceramic 17 | CcC 23 | SMT caps | leaf |

Table 1 represents a classification tree where the root has a fork with two choices: Capacitor 16 or Resistor 18. The Capacitor 16 branch has one choice: Ceramic 17. The Ceramic branch has one choice: Chip 19. The Commodity code is generated by starting with the Commodity code at Root 15 and appending as a suffix a character or set of characters that represent the selected branch. As long as the suffix is unique for all choices at a fork the resulting character string is unique and identifies the classification of the leaf item.

Figure 3:
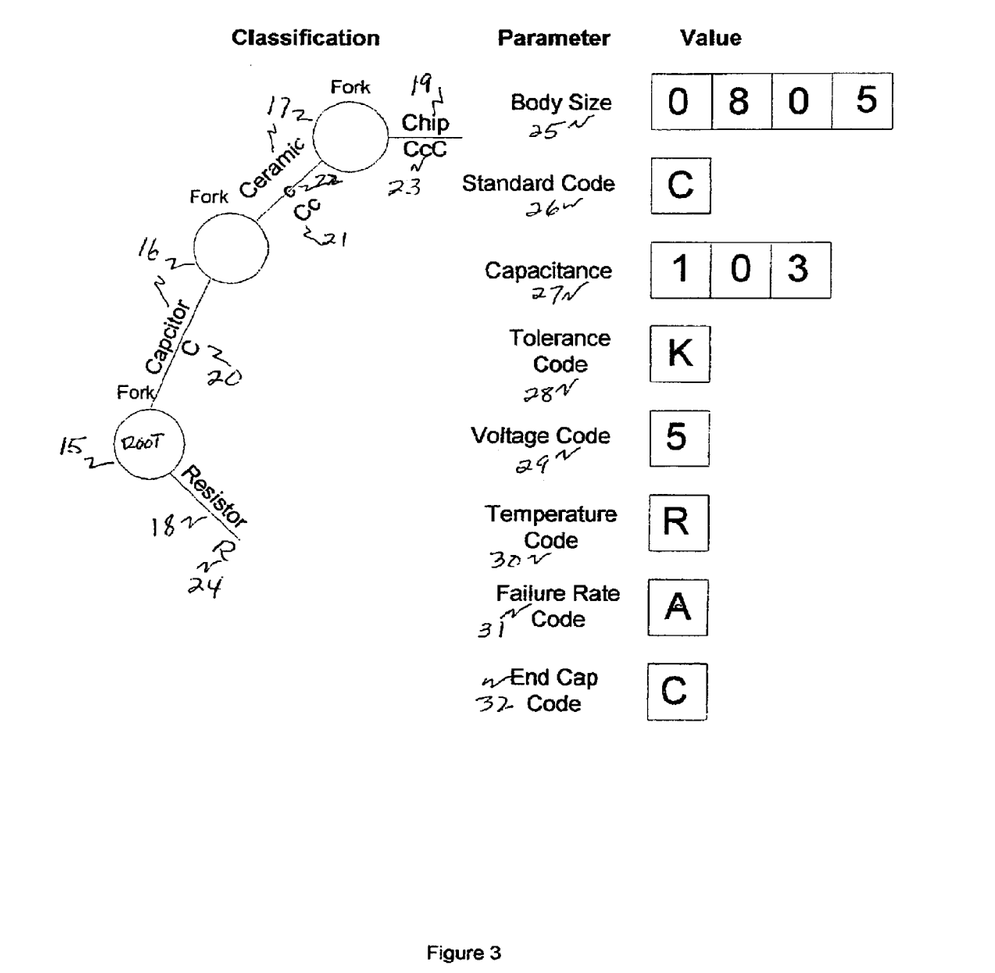
FIG. 3 illustrates a classification tree with parameter-value descriptions and lengths to generate a compact item descriptor.

Branches and leaves can be added to the classification tree by adding a row with a new Child name, the Parent branch, the commodity code from the parent with a suffix that is unique among the other children of the parent, the description of the branch or leaf, and the branch or leaf indicator. Each new leaf may require a set of parameters as described in the next paragraph. FIG. 3 illustrates the classification of the Chip capacitor of Table 1 and the Parameters with Values for the Kemet capacitor in FIG. 4. In FIG. 3 and Table 1, at the Root Fork 15, Capacitor 16 is selected to classify the item and the commodity code is C 20; at Capacitor 16. Ceramic 17 is selected and the commodity code is Cc 21 where the lower case "c" 22 was appended to C 20; at Ceramic 17, Chip 19 is selected and the commodity code is CcC 23 where the upper case "C" was appended to Cc 21. The Parameter values are encoded and concatenated as Body Size 25. Standard Code 26. Capacitance 27. Tolerance Code 28. Voltage Code 29. Temperature Code 30. Failure Rate Code 31. and End Cap Code 32 to form the string "0805C101K5RAC". The complete compact descriptor for the item is "CcC0805C103K5RAC".

The classification of an item is in general not sufficient to identify the item. A set of parameters is defined for a leaf and the assignment of values to the set of parameters with the classification identify the item. The parameter set is defined as a linked list associated with a leaf. Table 2. Parameter SQL Table is representative of the parameter link list where Parameter. ID identifies the row, Link identifies the predecessor row, Commodity Code is the unique identifier for the classified item, Parameter is the name of the parameter, Length is the number of characters for the value assigned to the parameter, and Character is a character string prefix to the assigned value.

TABLE 2

Parameter SQL Table

| Parameter ID | Link | Commodity Code | Parameter | Length | Character |
|---|---|---|---|---|---|
| 1 | START | CcC 23 | Body Size 25 | 4 | CcC 23 |
| 2 | 1 | CcC 23 | Standard code 26 | 1 | |
| 1 | 2 | CcC 23 | Capacitance 27 | 3 | |
| 4 | 3 | CcC 23 | Tolerance 28 | 1 | |
| 5 | 4 | CcC 23 | Voltage 29 | 1 | |
| S | 5 | CcC 23 | Temperature 30 | 1 | |
| 7 | 6 | CcC 23 | Failure rate 31 | 1 | |
| 8 | null | CcC 23 | End Metal 32 | 1 | |

Table 2 Parameter SQL Table represents the parameters matching those used by Kemet for the ceramic capacitor in FIG. 4. The catalog parameters could be different for ceramic capacitors. The parameters are tailored to complete the description of the classified item at a leaf. To generate the compact item descriptor for the Kemet capacitor, the data entry person would classify the item in the classification tree by first selecting Capacitor. The Capacitor branch would display the choices for capacitor materials in the catalog. Ceramic is the only choice and is selected. The ceramic branch would display the choice for type of ceramic capacitor. Chip ceramic capacitor is the only choice in the example and is selected. Chip is a leaf, a classification terminus. The list of parameters with data entry lines is displayed for entry of the parameter values. The operator enters the values corresponding to the specific item for which the description is being generated. For the Kemet capacitor in FIG. 4, the parameter values are illustrated in Table 3. Parameter Values. For simplicity, the Kemet value codes in FIG. 4 were used.

TABLE 3

Parameter Values

| Parameter | Value |
| --- | --- |
| Body Size | 0805 |
| Standard Code | C |
| Capacitance | 103 |
| Tolerance | K |
| Voltage | 5 |
| Temperature | R |
| Failure Rate | A |
| End Metal | C |

The compact item descriptor for the Kemet capacitor would be "CcC0805C103K5RAC".

The catalog is an SQL table represented as Table 4 Item Catalog where Item ID identifies the row, Supplier is the supplier name, Supplier PN is the supplier part number, Descriptor is the compact item descriptor, and Commodity code is the classification tree leaf for the item. The compact item descriptor information can be used to generate the Kemet part number. However, the Kemet part number is used to illustrate the use of the SQL tables.

TABLE 4

Item Catalog

| Item ID | Supplier | Supplier P/N | Descriptor | Commodity Code |
| --- | --- | --- | --- | --- |
| 1 | Kemet | C0805C103K5RAC | CcC0805C103K5RAC | CcC 23 |
| 2 | AllCaps | AC0805K103AWQ | CcC0805C103K5RAC | CcC 23 |
| 3 | Caps.com | CC534GRWO805X | CcC0805C103K5RAC | CcC 23 |

Table 4 Item Catalog represents the rows for the Kemet capacitor of FIG. 4 and interchangeable capacitors from two other suppliers: AllCaps and Caps.com. The part number for the part for AllCaps is "AC0805K103AWQ" and from Caps.com is "CC534GRW0805X". Since the capacitors are interchangeable, all have the same compact item descriptor. If the AML had the compact item descriptor CcC0805C103K5RAC, Kemet as the supplier, and C0805C103K5RAC as the supplier part number, the catalog can be queried with the SQL statement "Select [Supplier P/N] FROM [Item Catalog] Where Supplier='Kemet' AND Descriptor='CcC0805C103K5RAC'". If Supplier P/N=C0805C103K5RAC then the AML was correct. If the supplier part number was different, then the AML supplier part number is corrected to C0805C103K5RAC. If the contract manufacturer wanted to use a capacitor from AllCaps, the catalog query with the SQL statement "Select [Supplier PIN] FROM [Item Catalog] Where Supplier='AllCaps' AND Descriptor='CcC0805C103K5RAC'" returns Supplier PIN=AC0805K103AWQ, the part number to order the capacitor from AllCaps. The SQL statement query parameters can use the SQL wild cards in the Supplier P/N and in the Descriptor fields. The SQL statement "Select * FROM [Item Catalog] Where Supplier='Kemet' AND Descriptor='CcC0805_103K5%'" would return all capacitors where the specification field can be any character and the characters following the last 5 can be anything. So capacitors with the body size, capacitance, voltage, but with any specification, any tolerance, any failure rate, and any end metal will be returned in response to the catalog query.

Many of the suppliers of highly configurable items generate the part number based on the values of parameters. The, supplier part number can be generated from the compact item descriptor. The classification and list of parameter values captures the key characteristics of the item. The values are usually coded. Some of the codes are set by standard. The "0804" is the standard code for the package used for the SMT chip component. "103" is the classification tree code for 10,000 pico-farads. (The first two digits represent the value and the third digit represents the number of zeros or power of 10.) The Kemet code for 10,000 pico-farads is "103". The AllCaps code for 10,000 pico-farads is "10^3". Caps.com code for 10,000 pico-farads is "103". The code used for each parameter value can be mapped to the code for each supplier. Some of the characters in the supplier part number are determined from the classification. For example, the lead character "C" in the Kemet part number represents ceramic as the capacitor material. Ceramic is a parameter determined by the classification process. The classification and the parameter values can be mapped to generate the supplier part number.

The supplier part number in the AML may not be the core part number but may have the carrier suffix or other characters. The SQL wild card capabilities can be used so the supplier part number returns the correct supplier part number. The validation process can be improved if alternative representations of the supper part number could be queried. When a variant of a supplier part number is encountered, the variant is used to identify the core supplier part number and the variant is saved in the database so that another AML with the variant will not require the special processing. The alias process information is illustrated in Table 5 Supplier Part Number Alias Table where Supplier is the supplier name and Item ID is the row in the Item Catalog Table with the core supplier part number and descriptor and Supplier PIN Alias is the supplier part number variant.

TABLE 5

Supplier P/N Alias Table

| Supplier | Item ID | Supplier P/N Alias |
| --- | --- | --- |
| Kemet | 1 | C0805C103K5RAC |
| Kemet | 1 | C0805C103K5RACTU |
| AllCaps | 2 | AC0805K103AWQ |
| AllCaps | 2 | AC0805K103AWQT |
| Caps.com | 3 | CC534GRW0805X |

Table 5 Supplier P/N Alias Table represents the alias part numbers for Kemet part number C0805C103K5RAC where part number C0805C103K5RACTU has the suffix "TU". When the catalog is queried using either suppler part number C0805C103K5RAC or supplier part number C0805C103K5RACTU for supplier Kemet, the same Item ID=1 row in the Item Catalog will be returned by the catalog. Similarly, for supplier AllCaps, supplier part number AC0805K103AWQ or supplier part number AC0805K103AWQT will return the Item Catalog row with Item ID=2.

The supplier part numbers in Table 4 Item Catalog are the core part number. The carrier suffix must be concatenated to the core part number to order the part so that it can be placed using automated assembly equipment. A supplier provides a set of carrier suffixes that are not part number specific but may depend on the dimensions or package size of the items. The set of carrier suffixes from a first supplier may not match the set of carrier suffixed from a second supplier. The supplier suffix information is illustrated in Table 6 Supplier Suffix Table where Supplier is the supplier name, Package is the item package size code, Carrier is the type of carrier, and Count is the number of item units in the carrier, and Suffix is the part number suffix to order the carrier.

TABLE 6

Supplier Suffix Table

| Supplier | Package | Carrier | Count | Suffix |
|----------|---------|---------|-------|--------|
| Kemet | 0805 | 7" Plastic Tape | 4000 | TU |
| Kemet | 0805 | Bulk | 10000 | 9028 |
| Kemet | 0805 | 13" Plastic Tape | 10000 | 7210 |
| Kemet | 0805 | 7" Paper Tape | 4000 | 7867 |

Table 6 Supplier Suffix Table illustrates some of the carrier options for the Kemet capacitor illustrated in FIG. 4. The Kemet part number to order the example capacitor in a 13" Plastic Tape is C0805C103K5RAC7210 where the core part number is C0805C103K5RAC and the carrier suffix is 7210.

The two-step AML validation process
1. The compact item descriptor and the supplier name query a catalog to determine the core supplier part number independent of the manufacturing line requirements.
2. The compact item descriptor and the Supplier Suffix Table are used to determine the item carrier that meets the manufacturing line requirements and the supplier part number suffix. Concatenating the suffix to the core supplier part number forms the complete suppler part number.

If the AML is used for a second manufacturing line, step 2 is performed with the requirements of the second manufacturing line. The more difficult step 1 is not is not repeated since step 1 validated the AML independent of the manufacturing line requirements.

The compact item descriptor describes an item such that two different items with the same compact item descriptor are interchangeable. The compact item descriptor serves as the description of the item in the materials planning system and/or the AML. A catalog responds to queries with the compact item descriptor and a supplier name by returning supplier part number of the item. In addition, catalog responds to queries with the compact item descriptor by returning a supplier name and supplier part number of the item for an interchangeable item. The catalog also responds to queries with the supplier name and supplier part number by returning the compact item descriptor. The compact item descriptor and catalog can be used to validate the supplier part number in the AML or to locate alternate suppliers and supplier part numbers for interchangeable items. If a supplier part number is derived from the parameter values of the item, the catalog can generate the supplier part number from the compact item descriptor.

If the item has a supplier part number that is dependent on the manufacturing process in which the item will be used, the two-step AML process first validates the AML independent of the manufacturing process; then, determines the supplier part number based on the manufacturing process requirements. If the item is used in a manufacturing process with different requirements, the second AML process step is performed with the different requirement to generate the supplier part number for the different manufacturing process.

I claim:

1. A method executed by a computer to generate in a first database system a compact item descriptor, a machine readable character string, and determine the interchangeability of two items from their compact item descriptors; the method comprising the steps:

providing a first item;
providing a second item;
providing a classification tree as a recursive structure in the first database comprising a root parent fork with child branches to child forks with child branches or child leaves each with a set of parameters which classifies a set of items including the first item and second item where two different items that classify to the same child leaf and same parameter values are interchangeable or those that do not classify to the same child leaf and same parameter values are not interchangeable;
labeling by the computer, at each fork of the classification tree, a character or sub-string of characters that distinguishes each child branch or child leaf of the fork;
generating a commodity code, a character string that uniquely identifies the sequence of child branches and child leaf selected for the classification of an item represented by the child leaf, starting at the root of the classification tree with a character string representing the root and systematically appending the label representing the child branch or child leaf selected at each fork to classify the item;
ordering the set of parameters for each child leaf that complete the description of an item classified at the child leaf and encoding the value for each parameter as a string of predefined length in the ordered parameter sequence so the parameter values for an item classified at the child leaf are represented as a character string;
defining the compact item descriptor for an item as the commodity code for the item concatenated with the encoded parameter values for the item;
generating the compact item descriptor for the first item;
generating the compact item descriptor for the second item;
and comparing, by the computer, the compact item descriptor for the first item with the compact item descriptor for the second item wherein if the two compact item descriptors are the same then the items are interchangeable and if the compact item descriptors are different then the items are not interchangeable.

2. The compact item descriptor of claim 1 and the first database providing an entry including an item part number and item description field wherein the item part number for the first item is stored as the item part number and the compact item descriptor for the first item is stored in the item description field of the database entry, and, the first database item description field queried using the compact item descriptor of the first item as the query argument and the first database returns the part number for the first item as the response to the query.

3. The compact item descriptor of claim 1, the first database, and interchangeable first item and second item; where the first database provides an entry for the first item comprising an item description field containing the compact item descriptor for the first item, supplier name, and supplier part number for the first item; and, the database item description field is queried with the compact item descriptor for the second item and the database responds with the supplier name and supplier part number for the first item.

4. The compact item descriptor of claim 1 and the first database wherein the first database provides an entry for the first item comprising an item description field containing the compact item descriptor for the first item, the supplier name, and the supplier part number for the first item; and, the first database is queried with the supplier name and the supplier part number for the first item and the first database responds with the compact item descriptor for the first item.

5. The compact item descriptor of claim 1, the first database, and a second database wherein the first database provides an entry comprising a part number for the first item and an item description field; and the second database provides an entry for the first item comprising the supplier name, the supplier part number, and compact item descriptor in the description field for the first item where the second database is queried with the supplier name and the supplier part number of the first item, the second database responds with the compact item descriptor of the first item, and the compact item descriptor for the first item is stored in the item description field of the first item in the first database.

6. The compact item descriptor of claim 1 and interchangeable first item and second item; and the first database providing an entry comprising a part number, an item description field containing the compact item descriptor for the first item, a supplier name, and a supplier part number for the first item; and the first database is queried with the compact item descriptor of the second item as the item description argument and the database responds with the supplier name and the supplier part number for the first item.

7. The compact item descriptor of claim 1, interchangeable first item and second item, and the first database providing an entry comprising a part number, an item description field containing the compact item descriptor for the first item, the supplier name and the supplier part number for the first item and a second database providing an entry comprising an item description field containing the compact item descriptor of the second item, the supplier name and supplier part number for the second item wherein the second database description field is queried with the compact item descriptor for the first item and the second database responds with the supplier name and supplier part number for an interchangeable item, the second item.

8. The compact item descriptor of claim 1, interchangeable first item and second item; and the first database providing an entry comprising an item description field containing the compact item descriptor for the first item, a supplier name, and a supplier part number for the first item wherein the first database item descriptor field is queried with the compact item descriptor for the second item and the supplier name for the first item and the first database responds with supplier part number for the first item, an interchangeable item from the supplier with the supplier name.

9. The compact item descriptor of claim 1 and the first database providing for the first item, a supplier name, supplier part number, and an item description field containing the first compact item descriptor and the first database item description field is queried with a compact item descriptor including a Standard Query Language, SQL, wild card character to partially specify a compact item descriptor where the first compact item descriptor matches the partially specified compact item descriptor and the first database responds with the supplier name and supplier part number of the first item.

10. The compact item descriptor of claim 1 and the first database providing for the first tern a description field containing the compact item descriptor, a supplier name, and a core supplier part number wherein the first database description field is queried with the compact item descriptor for the first item and supplier name and the first database responds with the core supplier part number for the first item and a supplier suffix table providing a mapping of supplier names and manufacturing process requirements to modifications to the core supplier part numbers is queried with the supplier name and a manufacturing process requirement and the supplier suffix table responds with the modification to the core supplier part number so the resulting supplier part number corresponds to a first item that meets the manufacturing process requirement.

11. A method executed by a computer to generate in a database system a compact item descriptor, a machine readable character string, the method comprising the steps:
providing a first item;
providing a classification tree as a recursive structure in the database comprising a root parent fork with child branches to child forks with child branches or child leaves each with a set of parameters which classifies a set of items including the first item where two different items that classify to the same child leaf and parameter values are interchangeable or those that do not classify to the same child leaf and parameter values are not interchangeable;
labeling by the computer, at each fork of the classification tree, a character or sub-string of characters that distinguishes each child branch or child leaf of the fork;
generating a commodity code, a character string that uniquely identifies the sequence of child branches and child leaf selected for the classification of an item represented by the child leaf, starting at the root of the classification tree with a character string representing the root and systematically appending the label representing the child branch or child leaf selected at each fork to classify the item;
ordering the set of parameters for each child leaf that complete the description of an item classified at the child leaf and encoding the value for each parameter as a string of predefined length in the ordered parameter sequence such that the parameter values for an item classified at the child leaf are represented as a character string;
generating the commodity code for the first item;
encoding the parameter values at the child leaf for the first item;
defining the compact item descriptor for the first item as the commodity code for the first item concatenated with the encoded parameter values for the first item;
generating the compact item descriptor for the first item;
generating a compact item descriptor for a second item;
comparing, by the computer, the compact item descriptor for the second item with the compact item descriptor for the first item; and determining the interchangeability of the first item and second item wherein if the compact item descriptors are the same then the items are interchangeable and if the compact item descriptors are different then the items are not interchangeable.

12. The compact item descriptor of claim 11 and the second item where the second item is interchangeable with the first item and the classification tree classifies the second item, and the database with an entry for the first item comprising an item description field containing the compact item descriptor for the first item, supplier name, and supplier part number for the first item; the compact item descriptor for the second item is generated; wherein, the database item description field is queried with the compact item descriptor for the second item and the database responds with the supplier name and supplier part number for the first item.

13. The compact item descriptor of claim 11 and the database providing for the first item, a supplier name, supplier part number, and an item description field containing the first compact item descriptor and the database item description field is queried with a compact item descriptor including a Standard Query Language, SQL, wild card character to partially specify a compact item descriptor where the first compact item descriptor matches the partially specified compact item descriptor and the database responds with the supplier name and supplier part number of the first item.

14. A method executed by a computer to encode in a database system the classification and parameter values of an item into a machine readable character string where two items with the same classification and parameter values encode the same string or two items with different classifications or parameter values encode different strings, the method comprising:

providing a first item;

providing a second item;

providing a classification tree as a recursive database structure comprising a root parent fork with child branches to child forks with child branches or child leaves each with a set of parameters where the classification tree classifies a set of items including the first item and second item;

labeling by the computer, at each fork of the classification tree, a character or sub-string of characters that distinguishes each child branch or child leaf of the fork;

generating a commodity code, a character string that uniquely identifies the sequence of child branches and child leaf selected for the classification of an item represented by the child leaf, starting at the root of the classification tree with a character string representing the root and systematically appending the label representing the child branch or child leaf selected at each fork to classify the item;

ordering the set of parameters for each child leaf that complete the description of an item classified at the child leaf and encoding the value for each parameter as a string of predefined length in the ordered parameter sequence such that the parameter values for an item classified at the leaf are represented as a character string;

generating the commodity code for the first item;

encoding the parameter values at the leaf for the first item;

generating the encoded string for the first item as the commodity code for the first item concatenated with the encoded parameter values for the first item;

generating the commodity code for the second item;

encoding the parameter values at the leaf for the second item;

generating the encoded string for the second item as the commodity code for the second item concatenated with the encoded parameter values for the second item;

comparing, by the computer, the encoded string for the first item with the encoded string for the second item where either the encoded strings are the same and the first item and second item classify to the same child leaf with the same parameter values or the encoded strings are different and the first item and second item do not classify to the same child leaf with the same parameter values.

15. The encoded classification of claim 14 where the first item and second item classify to the same child leaf with the same parameter values and the database provides an entry for the first item comprising an item description field containing the encoded string for the first item and an associated field for the first item; wherein, the database item description field is queried with the encoded string for the second item and the database responds with the associated field for the first item.

16. The encoded string of claim 14 and the database provides for the first item, an item description field containing the encoded string for the first item and an associated field and the database item description field is queried with an encoded string including a Standard Query Language, SQL, wild card character to partially specify a encoded string where the encoded string for the first item matches the partially specified encoded string and the database responds with the associated field for the first item.

17. The compact descriptor of claim 1 and the first item wherein the compact descriptor for the first item is generated in the first database and the compact descriptor is used as the description of the first item in documents that provide the first item description.

18. The compact descriptor of claim 1 and the first item wherein the first item has an alias part number as an alternative to the part number and the first database provides a supplier part number alias table that relates the first item to the alias part number and a query of the supplier part number table with the alias part number returns the first item with the compact descriptor.

19. The method of claim 1, and the first item wherein the first item classifies to a classification tree child leaf and generates a commodity code and the commodity code for the first item is used in documents and systems that provide a commodity code.

* * * * *